United States Patent
Norton et al.

(10) Patent No.: US 11,068,386 B1
(45) Date of Patent: *Jul. 20, 2021

(54) SYSTEMS AND METHODS FOR MAINFRAME BATCH TESTING

(71) Applicant: STATE FARM MUTUAL AUTOMOBILE INSURANCE COMPANY, Bloomington, IL (US)

(72) Inventors: Joseph W. Norton, Normal, IL (US); James D. Titlow, Bloomington, IL (US); Matthew W. Holloway, Marietta, GA (US); Amanda J. Tolonen, Downs, IL (US); Venkata R. Kongara, Fairview, TX (US); Timothy J. Wheeler, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,749

(22) Filed: Dec. 2, 2019

Related U.S. Application Data

(63) Continuation of application No. 15/870,410, filed on Jan. 12, 2018, now Pat. No. 10,521,337, which is a
(Continued)

(51) Int. Cl.
*G06F 11/36* (2006.01)
*G06Q 40/08* (2012.01)

(52) U.S. Cl.
CPC ...... *G06F 11/3692* (2013.01); *G06F 11/3684* (2013.01); *G06F 11/3688* (2013.01); *G06Q 40/08* (2013.01)

(58) Field of Classification Search
CPC .................. G06F 11/3692; G06F 11/3684
(Continued)

(56) References Cited

U.S. PATENT DOCUMENTS 6,526,544 B1   2/2003   Peled et al.
8,689,185 B1   4/2014   Myers et al.
(Continued)

OTHER PUBLICATIONS

Bran Selic, Garth Gullekson, and Paul T. Ward, Real-Time Object-Oriented Modeling, John Wiley & Sons, Inc., 1994:1-498.
(Continued)

*Primary Examiner* — Chae M Ko
(74) *Attorney, Agent, or Firm* — Marshall, Gerstein & Borun LLP

(57) ABSTRACT

Methods and systems for performing mainframe batch testing and/or property-based validation testing using a finite-state machine are provided. According to certain aspects, a validation server may receive a set of batch data designed to validate a property under test, such as during mainframe batch testing. A validation server may validate that the set of batch data is in a proper format. The validation server may then cause a finite-state machine to process instructions contained within the set of batch data. Once the finite-state machine processes the set of batch data, the validation server may then validate that the finite-state machine adheres to the property under test. If the validation fails, the validation server may generate an error report describing the failure.

19 Claims, 5 Drawing Sheets

Related U.S. Application Data continuation of application No. 14/884,930, filed on Oct. 16, 2015, now Pat. No. 9,916,234.

(60) Provisional application No. 62/106,002, filed on Jan. 21, 2015.

(58) Field of Classification Search
USPC .......................................................... 714/33
See application file for complete search history.

(56) References Cited

U.S. PATENT DOCUMENTS

| | | |
|---|---|---|
| 2007/0022325 A1 | 1/2007 | Morizawa et al. |
| 2008/0046331 A1 | 2/2008 | Rand |
| 2008/0077780 A1* | 3/2008 | Zingher .............. G06F 11/3636 712/227 |
| 2008/0215925 A1 | 9/2008 | Degenaro et al. |
| 2008/0312890 A1 | 12/2008 | Zhu et al. |
| 2009/0326852 A1 | 12/2009 | Vetter et al. |
| 2012/0109708 A1 | 5/2012 | Mueller et al. |
| 2013/0232924 A1 | 9/2013 | Bergman |
| 2014/0081632 A1 | 3/2014 | Sasaki |
| 2014/0115566 A1 | 4/2014 | Cao |
| 2014/0344633 A1 | 11/2014 | Li et al. |
| 2015/0339435 A1 | 11/2015 | Greenberg |
| 2017/0331850 A1* | 11/2017 | Li ........................ G06F 21/577 |

OTHER PUBLICATIONS

PropEr, Retrieved from the Internet at:<URL:http://proper.softlab.ntua.gr/index.html>, Jul. 24, 2011.

PropEr, Module proper_statem, Retrieved from the Internet at:<URL:http://proper.softlab.ntua.gr/doc/proper_statem.html>, Apr. 3, 2013.

PropEr: A QuickCheck-inspired property-based testing tool for Erlang, Retrieved from the Internet at:<URL:http://proper.softlab.ntua.gr/doc/overview-summary.html>, Apr. 3, 2013.

PropEr, A QuickCheck-Inspired Property-Based Testing Tool for Erlang Tutorials, Retrieved from the Internet at:<URL:http://proper.softlab.ntua.gr/Tutorials/>, Jun. 1, 2011.

Finite-state machine, Wikipedia, Retrieved from the Internet at:<URL:https://en.wikipedia.org/wiki/Finite-state_machine>, Jan. 10, 2016.

QuickCheck, Wikipedia, Retrieved from the Internet at:<URL:https://en.wikipedia.org/wiki/QuickCheck>, Dec. 12, 2015.

Introduction to QuickCheck2, Retrieved from the Internet at:<URL:https://wiki.haskell.org/Introduction_to_QuickCheck2>, Nov. 13, 2015.

Fink et al., Property-Based Testing; a New Approach to Testing for Assurance, Software Engineering Notes, vol. 22, No. 4, pp. 74-80 (1997).

* cited by examiner

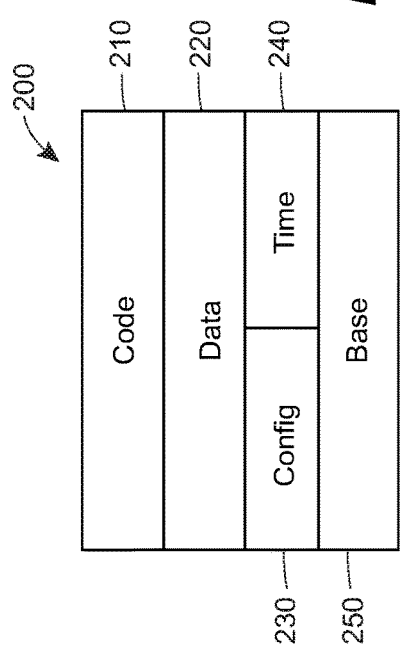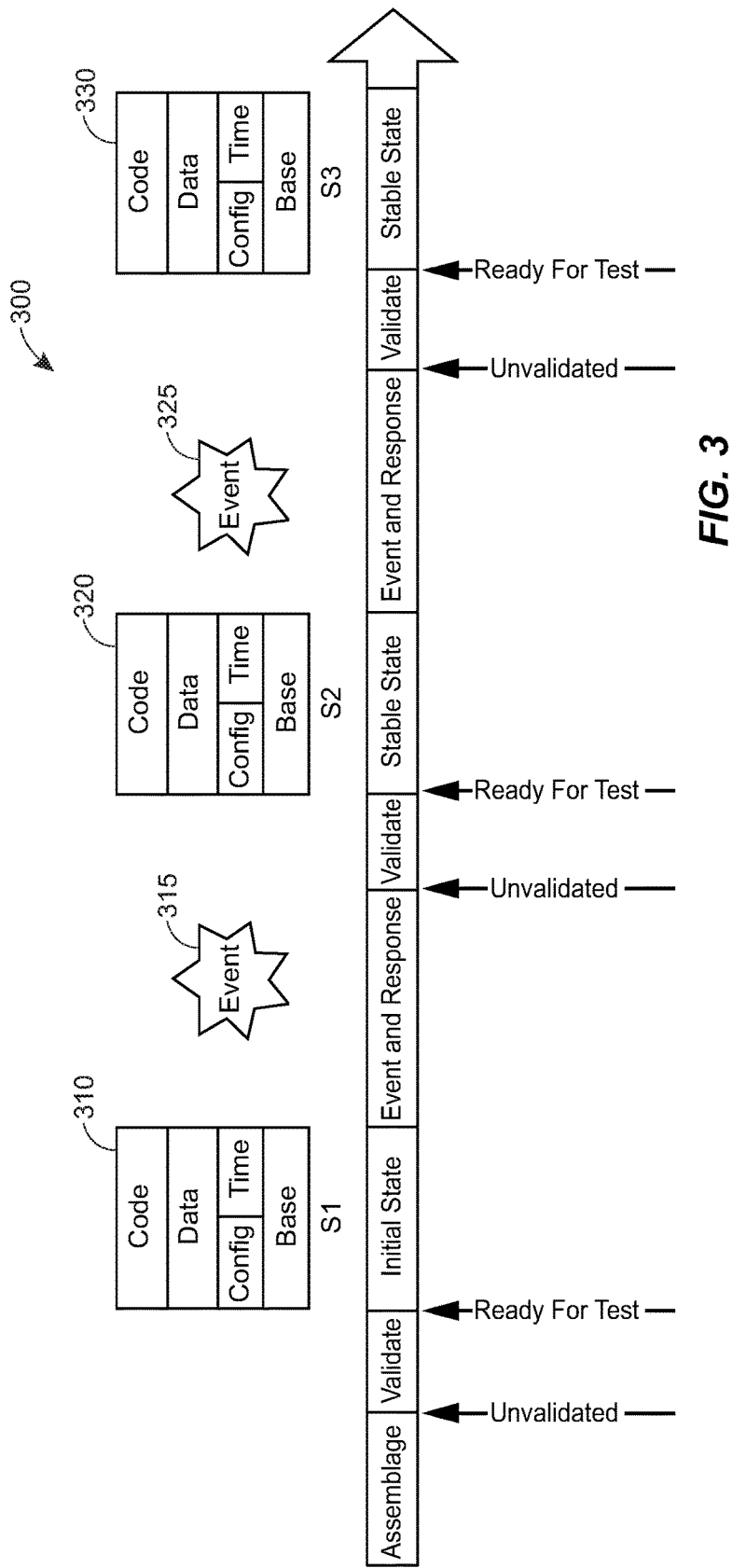

SYSTEMS AND METHODS FOR MAINFRAME BATCH TESTING

CROSS-REFERENCE TO RELATED APPLICATIONS

The present application is a continuation of U.S. patent application Ser. No. 15/870,410 filed Jan. 12, 2018, entitled "Systems and Methods for Mainframe Batch Testing," which is a continuation of U.S. patent application Ser. No. 14/884,930, entitled "Systems and Methods for Mainframe Batch Testing," filed on Oct. 16, 2015 which claims the benefit of U.S. Provisional Application No. 62/106,002, entitled "Systems and Methods for Property-Based Validation Testing using a Finite-State Machine," filed on Jan. 21, 2015. The entirety of each of which is hereby incorporated by reference.

FIELD OF THE DISCLOSURE

The present disclosure generally relates to testing the implementation of properties, more particularly, to systems and methods that perform property-based testing using a finite-state machine that replicates the properties of a production mainframe batch system.

BACKGROUND

Mainframe batch systems are commonly utilized by companies to automatically process large volumes of tasks at once. These systems enable such companies to maximize the usage of their computer resources resulting in more efficient and cheaper processing of data. For example, an insurance provider may batch process the creation or modification of policies that occurred throughout a day during overnight processing.

However, as a company evolves and develops new and updated products and services, there is a need for companies to update their mainframe batch systems to facilitate the processing of these new and updated products and services. Updating these systems may present various obstacles, such as obstacles related to testing and/or service disruptions.

SUMMARY

The present embodiments may, inter alia, detect errors in computer system upgrades in a test environment using property-based validation testing without impacting the production environment. For instance, changes and/or updates to a mainframe batch system may be facilitated by testing the changes and/or updates in a test environment. As a result, accidental disruption to the functionality currently provided by the mainframe batch system may be alleviated.

In one aspect, a method implemented in a test computer environment is provided. The test computer environment may contain a finite-state machine (FSM) that replicates a production computer environment in a first state. The method may include (1) receiving, via a computer network, a first set of batch data, wherein the first set of batch data is designed to determine whether a first set of properties corresponding to the FSM are properly implemented; (2) validating, via one or more particularly programmed processors, that data contained in the first set of batch data is in a valid format by confirming any data field contained within the first set of batch data is in a proper format for the corresponding data field, wherein the data fields include at least one of an insurance policy number, a claim identification number, a person associated with an insurance policy, a property owned by a policyholder, a vehicle owned by a policyholder, or a date corresponding to a transaction request; (3) processing, via the one or more processors, the first set of batch data, wherein the processing of the first set of batch data causes the FSM to enter a second state; (4) validating, via the one or more processors, that corresponding data fields of the second state of the FSM adheres to the first set of properties under test; and (5) based upon the validations, generating, via the one or more processors, an indication of whether the first set of batch data and the second state of the FSM are valid. The method may include additional, fewer, or alternate actions, including those discussed elsewhere herein.

In another aspect, a system may be provided. The system may include (i) a communication module adapted to communicate data; (ii) a finite-state machine (FSM), wherein an initial state of the FSM replicates a state of a production computer component; (iii) a memory adapted to store non-transitory computer executable instructions; and (iv) one or more particularly programmed processors adapted to interface with the communication module. The one or more processors may be configured to execute the non-transitory computer executable instructions to cause the system to (1) receive, via the communication module, a first set of batch data, wherein the first set of batch data is designed to determine whether a first set of properties corresponding to the FSM are properly implemented; (2) validate that data contained in the first set of batch data is in a valid format by confirming any data field contained within the first set of batch data is in a proper format for the corresponding data field, wherein the data fields include at least one of an insurance policy number, a claim identification number, a person associated with an insurance policy, a property owned by a policyholder, a vehicle owned by a policyholder, or a date corresponding to a transaction request; (3) process the first set of batch data, wherein the processing of the first set of batch data causes the FSM to enter a second state; (4) validate that corresponding data fields of the second state of the FSM adheres to the first set of properties under test; and (5) based upon the validations, generate an indication of whether the first set of batch data and the second state of the FSM are valid. The system may include additional, less, or alternate components and functionality, including that discussed elsewhere herein.

In still another aspect, a non-transitory computer-readable storage medium storing processor-executable instructions may be provided. When executed, the instructions may cause one or more particularly programmed processors to (1) receive, via a computer network, a first set of batch data, wherein the first set of batch data is designed to determine whether a first set of properties corresponding to a finite-state machine are properly implemented; (2) validate, by the one or more processors, that data contained in the first set of batch data is in a valid format by confirming any data field contained within the first set of batch data is in a proper format for the corresponding data field, wherein the data fields include at least one of an insurance policy number, a claim identification number, a person associated with an insurance policy, a property owned by a policyholder, a vehicle owned by a policyholder, or a date corresponding to a transaction request; (3) process, by the one or more processors, the first set of batch data, wherein the processing of the first set of batch data causes the finite-state machine to enter a new state; (4) validate, by the one or more processors, that corresponding data fields of the new state of the finite-state machine adheres to the first set of properties under test; and (5) based upon the validations, generate, by the one or more processors, an indication of whether the first set of batch data and the new state of the finite-state machine are valid. The non-transitory computer-readable storage medium may include additional, fewer, or alternate instructions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 2 depicts an exemplary representation of a state as implemented by a finite-state machine, such as the finite-state machine of FIG. 1, in accordance with some embodiments.

FIG. 3 depicts an exemplary state diagram associated with a finite-state machine, such as the finite-state machine of FIG. 1, in accordance with some embodiments.

DETAILED DESCRIPTION

Figure 1:
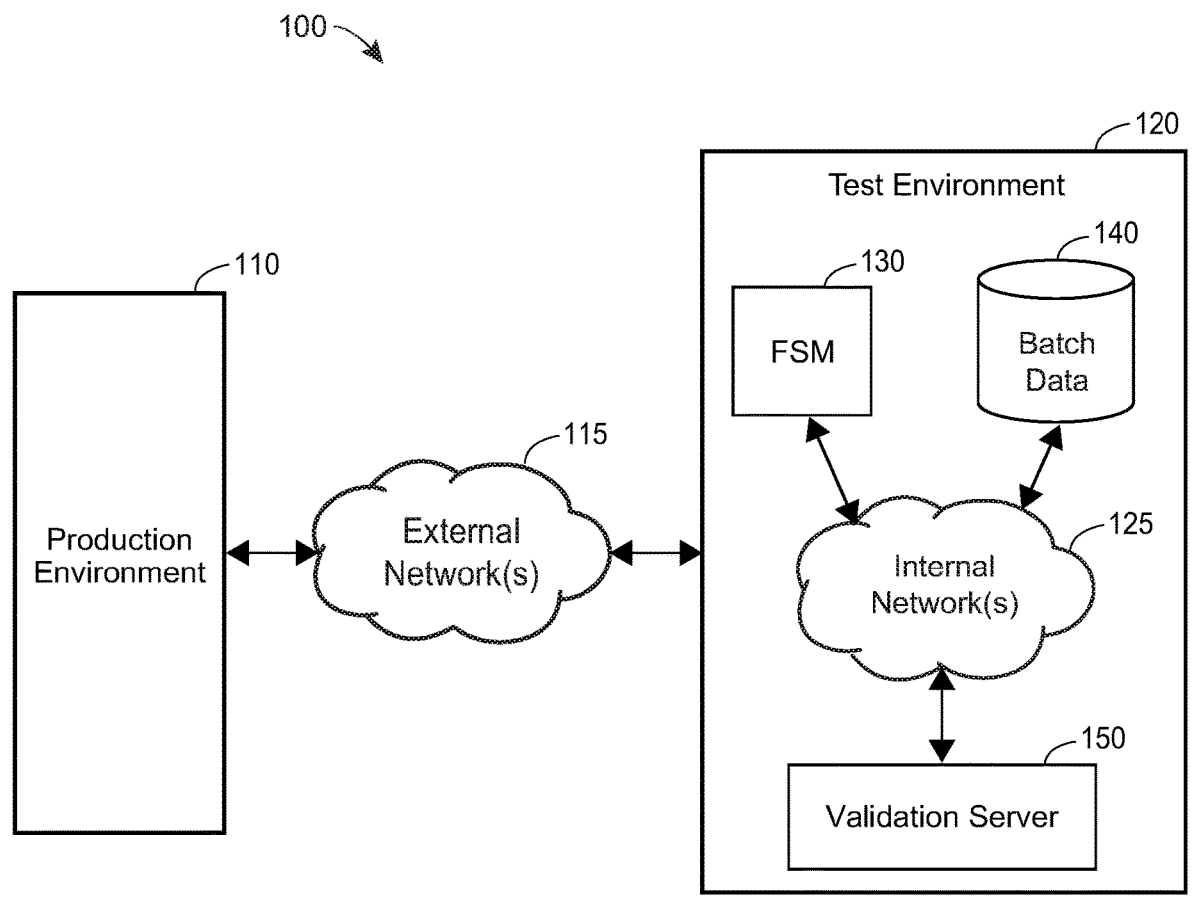
FIG. 1 depicts an exemplary environment including components and entities associated with property-based validation testing using a finite-state state machine in accordance with some embodiments.

The present embodiments may relate to, inter alia, the prevention, detection, and/or correction of errors while implementing a mainframe batch system and/or other batch processing systems (e.g., personal computers, smart phones, servers). The present embodiments may further relate to a mainframe batch system capable of (a) providing and updating insurance policies; (b) handling or adjusting of home, fire, automotive, personal articles, life, health, renters, and/or other insurance claims; (c) disbursing monies related to insurance claims; (d) providing discounts on insurance; (e) executing reward programs; and/or (f) performing other insurance-related activities.

Mainframe batch systems may include a plurality of different hardware and/or software modules to execute the processing. For instance, an insurer may include a policy generation module, a claim processing module, and/or a risk determination module to name a few. Prior to releasing an update to the mainframe batch system in the production system and/or a module therein, a company may conduct property-based validation testing using a finite-state machine within a test computing environment. This test computing environment may replicate components of the production mainframe batch system required to validate that updates to a module are error free and adhere to a set of desired properties. In addition to determining whether modifications are error free, property-based validation may enable a company to spot check modules in the production mainframe batch environment to catch any currently existing customer-facing errors.

A "finite-state machine" (FSM) may comprise a plurality of possible "states" that represent a condition of the FSM and/or a collection of stored information accessible by the FSM. As described elsewhere herein, the current state may represent the collection of hardware and/or software modules, as well as any data stored therein. When the data stored by the FSM changes, the FSM may transition to a new state. It should be appreciated that a FSM may only exist in a single state at any given time. As used herein, when an FSM is implemented in a test computer environment, the "state of the FSM" may also be used interchangeably with the "state of the test computer environment."

As used herein, "property" may refer to a description of sets of data contained within a hardware and/or software module or environment. When determining whether a property "holds true," one validates that the sets of data within the module or environment are consistent with, or adheres to, a corresponding description. For example, a property may define that policyholders living within a particular geographic region should be classified as "high risk." If the module or environment contains data that indicates that a policyholder within the particular geographic region is classified as "low risk," then the module or environment did not "hold true" to the property. Conversely, if the module or environment contains data indicating that all policyholders within the same particular geographical region are classified as "high risk," then the module or environment "held true" to the property.

The systems and methods therefore may offer a benefit to thoroughly validate the implementation of hardware and/or software modules to detect errors that currently or could potentially impact customers. If an error does exist, performing property-based validation testing may provide a company precise insights into the types of scenarios that trigger the error. These insights may enable a developer to better understand the source of the error in order to more efficiently correct the error. Thus, the presents systems and methods may reduce overall development costs for a company and/or ensure that the mainframe batch executes instructions with fewer errors. In addition to mainframe batch systems, the present systems and methods may provide improvements to other technological fields, such as wireless communication networks, video game development, and/or control systems.

I. Exemplary Environment for Property-Based Testing

FIG. 1 depicts an exemplary environment 100 associated with property-based testing. Although FIG. 1 depicts certain entities, components, and devices, it should be appreciated that additional or alternate entities and components are envisioned.

As illustrated in FIG. 1, the environment 100 may include both a production environment 110 and a test environment 120. The production environment 110 may represent all of the end user-facing hardware and software modules utilized by a company. The test environment 120 may represent a separate collection of hardware and software modules for developers to debug modules prior to release in the end user-facing production environment 110. The modules of the test environment 120 may replicate or mirror the corresponding modules of the production environment 110 required to debug the particular module under test. For example, the production environment 110 may contain a module for generating policy numbers to new insurance policies. When an insurance provider develops a new insurance product, the policy generator module may require an update. In this example, the test environment 120 may contain a new version of the policy generation module that supports the new insurance product to validate the implementation prior to releasing the new version of the policy generation module into the production environment 110.

The production environment 110 and the test environment 120 may be in communication with each other via external network(s) 115, such as, for example, a wide area network (WAN), a local area network (LAN), a personal area network (PAN), or other networks. The external network 115 may facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). For example, the external network 115 may be configured to facilitate the exchange of machine-readable code representative of a hardware or software module. In some scenarios, the production environment 110 may communicate machine-readable code representative of a particular module to facilitate the setup or creation of the test environment 120. When the machine-readable code represents a hardware module, the test environment 120 may create a "virtual" equivalent of the physical hardware module. In other scenarios, the test environment 120 may communicate machine-readable code representative of a particular module to "roll out" or "go live" with a change or update to the particular module.

According to present embodiments, the test environment 120 may include a finite-state machine (FSM) 130, a database of batch data 140, and a validation server 150. The FSM 130, the batch database 140, and the validation server 150 may communicate and/or be interconnected via an internal network 125. The internal network 125 may facilitate any data communication via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the external network 115 and the internal network 125 may utilize the same technology.

As will be discussed in more detail below, the FSM 130 may be configured to represent the current state of the test environment 120. To this end, the FSM 130 may be configured to include as many modules as necessary to validate the particular property(s) under test. Although FIG. 1 depicts the FSM 130 and the validation server 150 as separate entities, it should be appreciated in some embodiments, the FSM 130 may be implemented as a subcomponent of the validation server 150.

In general, the validation server 150, inter alia, (i) sets up or establishes an initial state of the FSM 130; (ii) processes sets of jobs stored in the batch database 140; (iii) validates that the FSM 130 complies with a property under test; and/or (iv) generates a report on the outcome of the property-based validation testing. In some scenarios, the validation server 150 provides an interface that enables a user to select components of the production environment 110 to include in the FSM 130 and/or enable a user to upload machine-readable code representative of a module to load into the FSM 130. Once the validation server 150 establishes the initial state of the FSM 130, it may perform a validation that the initial setup occurred without error.

According to present embodiments, the batch database 140 may include sets of batch jobs and/or batch inputs designed to test the implementation of the property under test in the test environment 120. For example, the property under test may be that when a policyholder lists a new item on their home, fire, or property insurance policy, the value of the property insured is increased by the value of the item. In this example, the batch database 140 may include batch jobs for adding varying values of the newly added item to a varying value of the previously existing covered property. In some scenarios, the batch jobs are manually generated for specific test cases. In other scenarios, a property-test tool (e.g., QuickCheck) may automatically generate a plurality of batch jobs designed to thoroughly evaluate adherence to the property(s) under test. The batch jobs stored in the batch database 140 may be segmented into discrete sets of batch jobs that function in coordination. The exemplary environment 100 may include additional, fewer, or alternate equipment or components, including those discussed elsewhere herein.

II. Exemplary Finite-State Machine Functionality

FIG. 2 depicts an exemplary representation of a "state" 200 as implemented by a FSM, such as the FSM 130 as described with respect to FIG. 1. The state 200 may be comprised of several components, including code 210, data 220, configuration 230, time 240 and/or base 250. While FIG. 2 depicts the aforementioned components, the state 200 may include additional, fewer, or alternate components, including those discussed elsewhere herein.

The code 210 represents the machine-readable code implemented by the FSM in order to validate adherence to the property under test by a test module. The code 210 may comprise software and/or hardware modules used in a production environment (such as the production environment 110 as described with respect to FIG. 1) and/or newly developed or updated modules that have not yet been released into the production environment. For example, an insurance provider may discover that systems that geographically determine insurance risk are unable to properly handle addresses containing non-numerical apartment numbers (e.g., 55 Main St. Apt. E). In this example, the code 210 may include an update to the geographic risk determination module that resolves this error. The code 210 may further include any number of additional modules needed to fully vet the fix for handling non-numerical apartment numbers (e.g., policy creation module, policy modification module, or any other module interacting with an address).

The data 220 represents the values and parameters implicated by the code 210. Returning to the non-numerical apartment number example, a test case may involve a policyholder moving to a new address that has a non-numerical apartment number. In this example, prior to processing the request to change address, the FSM may be in a state where the data 220 includes a data field representative of an insurance policy's address that lists the policyholder's original address. Once the policy update is processed, in a second state, the same data field for the insurance policy's address in the data 220 may now contain the new address with the non-numerical apartment number. Of course, depending upon the property(s) under test, the data 220 may include any number of different types of values and data fields (e.g., insurance policy numbers, claim identification numbers, people associated with an insurance policy, a property or vehicle owned by a policy holder, a transaction request status, and/or others).

The configuration 230 represents configuration files or middleware that facilitates communication between different software modules. In general, some modules may require additional configuration files that govern the operation of the particular module. The configuration files may also include version numbers for modules (and submodules contained therein) loaded into the code 210. As an example, a module that handles loyalty rewards may include a submodule for determining an appropriate award and a submodule for applying the award to a specific account. If there is an update to the award determination module, a test engineer may design test cases that ensure that the fix to the award determination module is compatible with a plurality of versions of the award application module. Accordingly, the configuration 230 may change the information about the version of the award application module loaded in the code 210 with each new iteration of the property-based validation testing.

The time 240 represents a specific time utilized by the FSM when validating the property(s) under test. In some cases, the time 240 may include the current time when the test is executing. In other cases, a particular time may be required. For example, many insurance policies expire on a particular date. The time 240 may be altered or configured such that FSM can validate whether the code 210 properly handles the expiration of an insurance policy. In some scenarios, the time 240 for the initial state may be set within the configuration 230 and/or by batch inputs from a set of batch data.

The base 250 represents the software for the FSM itself. For example, the FSM may be updated over time to include new testing functionality and/or the ability to virtually replicate new hardware modules. The FSM may also include several forms of "middleware" that facilitates more robust testing capabilities and/or ease of use. In some scenarios, the configuration of the middleware is contained as part of the configuration 230. In some scenarios, as the FSM transitions from one state to the next, the code 210, the configuration 230, and the base 250 remains constant, while the data 220 and the time 240 may update to new values. It should be appreciated that while a company may update the base of the state over time, the base may remain constant throughout the property-based validation testing as described herein.

III. Exemplary State Diagram

FIG. 3 depicts an exemplary state diagram 300 associated with a FSM, such as the FSM 130 as described with respect to FIG. 1, as it transitions through several states. Although FIG. 3 only depicts the FSM transitioning into new states twice, it should be appreciated that the FSM may transition to a new state any number of times.

According to the present embodiments, the FSM may begin by assembling the components and modules needed to form the initial state 310 ("S1"). A validation server, such as the validation server 150 as described with respect to FIG. 1, may begin the assemblage by receiving inputs that describe the desired test that will be performed. The validation server may then determine and locate modules required to execute the test and, subsequently, loads them into the code of the initial state 310. Similarly, the validation server may also load the configuration, data and time required by the desired test scenario into the initial state 310 of the FSM.

Once the initial state 310 is assembled, the validation server may validate that the assemblage properly occurred. In some scenarios, a module loaded into the code of initial state 310 may correspond to a set of test cases for the validation server to execute as part of a "sanity check" during initial assemblage. When the validation server successfully executes the sanity check test cases, the module is likely to be properly loaded into the code of the initial state 310. As an example, due to an error in the test environment, a machine-readable representation of a module loaded into the code of the initial state 310 may have been truncated. The sanity check test cases may be designed to catch such truncation errors. Another exemplary error may occur if the configuration of the initial state 310 indicates that a version of a module loaded into the code of the initial state 310 differs from the version indicated by the module that was actually loaded into the code of the initial state 310. In this example, the validation server may attempt to load the version indicated in the configuration of the initial state 310 a second time and/or generate an indication of the mismatch. Of course, the validation server may perform any number of additional or alternative tests to validate the assemblage of the initial state 310. After the initial validation is successfully, the FSM is ready to detect and process an event (e.g., a request to perform a set of actions).

Subsequently, the validation server may cause the FSM to respond to an event 315. The event 315 may be any event that causes any data field of the data of the initial state 310 to change. In some scenarios, the event 315 may be receiving a job or set of jobs stored in a database of batch jobs. In other scenarios, the event 315 may be the passage of time. After the FSM completes its response to the event 315, the validation server may validate that the FSM responded in the intended manner. As described elsewhere herein, the validation that occurs may vary based upon the nature of the event 315 and the intended response by the FSM. For example, an event to add a new driver to an automotive insurance policy may require validating that the data contained in the FSM includes a data field representative of drivers covered by the insurance policy, and that this data field includes the newly added driver.

After the validation server validates the FSM's response, the FSM may enter a second state 320 ("S2"). According to present embodiments, the FSM may remain in the second state 320 until a second event 325 is detected. The validation server may then validate that the response to the event 325 occurred in the intended manner. Similar to the validation to the response to the event 315, the validation may vary based upon the nature of the event 325 and the intended response by the FSM. Once the validation successfully validates the FSM's response to the event 325, the FSM may enter a third state 330 ("S3"). The exemplary state diagram 300 may continue this pattern of responding to events and/or validating the response for any number of subsequent events. The exemplary state diagram 300 may include additional, fewer, or alternate components or steps, including those discussed elsewhere herein.

IV. Exemplary Validation Server Functionality

Figure 4:
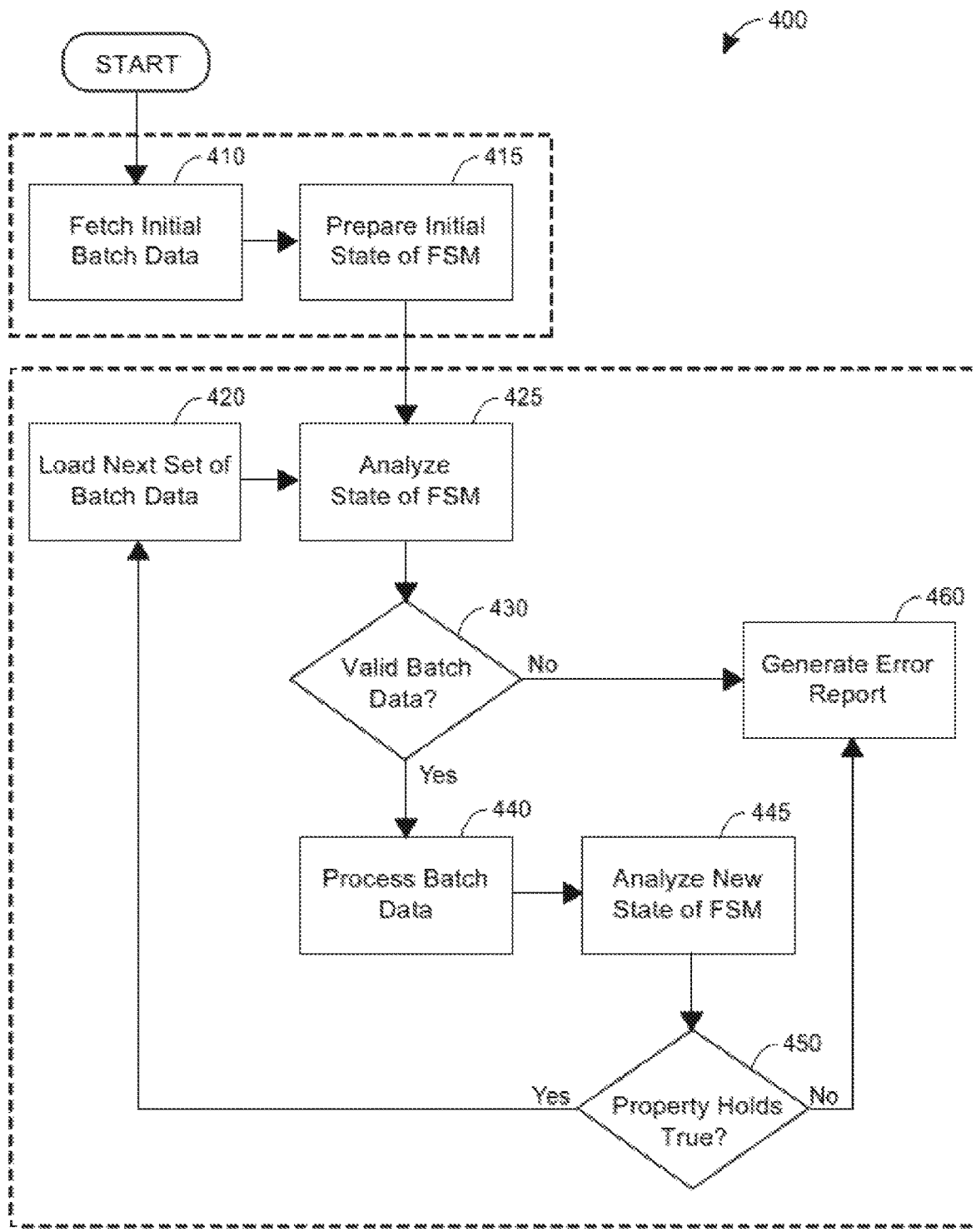
FIG. 4 depicts an exemplary flow diagram associated with a validation server, such as the validation server of FIG. 1, determining whether a property is properly implemented, in accordance with some embodiments.

Referring to FIG. 4, depicted is an exemplary flow diagram of a method 400 for determining whether a property is properly implemented. Although the method 400 is described herein as determining whether a single property is properly implemented, it also envisioned that the method 400 may determine whether a plurality of properties are properly implemented, either concurrently or serially. The method 400 may be facilitated by a validation server (such as the validation server 150 as depicted in FIG. 1) in communication with a FSM (such as the FSM 130 as depicted in FIG. 1) and a batch database (such as the batch database 140 as depicted in FIG. 1).

Prior to the start of method 400, the validation server may receive a series of inputs from a user defining the nature and/or scope of the property-based test. These inputs may include a definition of the property under test, a set of software and/or hardware modules required to test the property under test, m sets of batch data, and/or a time preference. In some scenarios, these inputs may be provided via graphical user interface and/or a command line interface. Additionally, the validation server may determine that the set of software and/or hardware modules is insufficient to properly validate the property under test and supplement the received set with additional modules. After receiving the series of inputs, the validation server may load the received m sets of batch data into the batch database.

To begin the method 400, the validation server may perform steps associated with preparing the FSM for testing (represented by the upper dashed box). The validation server may fetch the first or initial set of batch data (block 410). Each set of batch data may be divided into two parts: an initial set of data values (batch inputs) and a series of instructions to execute (batch jobs). For example, the batch inputs may include data fields representative of a particular automotive insurance policy that covers four drivers insured to drive two cars. On the other hand, the batch jobs may include instructions to perform tests that validate the property under test; for instance, adding a new driver to an insurance policy and/or modifying information describing a car covered by an insurance policy.

According to present embodiments, the validation server may then prepare the initial state of the FSM (block 415). One aspect of the initial preparation may include the validation server loading the initial batch inputs into the data component of the initial state. Another aspect of the initial preparation may be configuring the time component of the initial state based upon the received time preference. The time preference may indicate a specific time frame that FSM will simulate when processing the batch jobs. In some embodiments, the time preference may include a time just before an important date occurs (e.g., December $31^{st}$ at 11:58 pm). If no time preference is provided, the validation server may load the current time into the time component of the initial state. In some embodiments, instead of receiving the time preference from the user, the validation server may determine a time preference based upon the initial set of batch inputs.

In another aspect of the initial preparation, the validation server may fetch the modules indicated by the received inputs and load them into the code component of the initial state. In some scenarios, the validation server may have access to a repository of all hardware and/or software modules developed by a company. Based upon the received list of hardware and/or software modules, the validation server may copy the machine-readable representation of the indicated hardware and/or software modules from the repository into a data storage location that corresponds to the code component of the initial state. In some further scenarios, the set of received hardware and/or software modules may also include a version number for any number of the particular hardware and/or software modules. In these scenarios, the validation server may copy the machine-readable representation of the indicated version of the hardware and/or software module into the code component of the initial state. When no version numbers are provided, the validation server may copy the machine-representation of the latest released version of the indicated hardware and/or software module. In any case, the version numbers of all copied hardware and/or software modules may be loaded into the configuration component of the initial state. As previously described with respect to FIG. 3, the validation server may perform a sanity check to validate the assembly of the initial state of the FSM.

Once the validation server has successfully prepared the initial state of the FSM, the method 400 may perform m iterations of property-based validation testing (represented by the lower dashed box). As used herein, n represents the number of iterations of the property-based validation test that the validation server has begun to perform. Each iteration of the property-based validation test may begin by the validation server loading a set of batch data into the FSM (block 420). For the first iteration, the batch data may be already loaded as part of preparing the initial state. The validation server may analyze the current or $n^{th}$ set of batch data and/or copy the batch inputs from the $n^{th}$ set of batch data into the data component of the FSM.

In some embodiments where the batch inputs of $n^{th}$ set of batch data contains a time preference, that time preference may be loaded into the time component of the FSM. In order to save processing time and reduce the overall test duration, the code and/or configuration components of the FSM may remain constant throughout the iterative testing represented by the lower dashed box. However, it is envisioned that these components of the FSM may vary with each iteration (e.g., performing property-based validation testing across a plurality of versions of a particular module to detect the version in which the particular module stopped adhering to the property under test).

According to present embodiments, once the validation server loads the batch inputs into the data component of the FSM, the FSM is in an "initial" or "n−1" state. The validation server may proceed to analyze this initial state of the FSM (block 425). This analysis may be viewed as a "pre-test" that ensures the data component of the initial state only contains proper data prior to processing the batch jobs. The pre-test may consist of a two-step test: (i) confirm that the data is in a proper format; and/or (ii) confirm that the values of the data are within a range of allowable and/or expected values independent of the property under test.

While validating that the data is in a proper format, the validation server may first determine and/or query a set of rules pertaining to each data field contained within the data component of the $n^{th}$ state of the FSM. For example, a data field representative of the VIN for cars covered by an automobile insurance policy may be required to contain 17 characters excluding the letters "I," "O," and "Q." If a data field representative of a VIN contains an "I" or is less than 17 characters, for example, then that data field contains invalid data. As described above, the data fields contained within the data component of the $n^{th}$ state of the FSM may represent a plurality of different types of data. Each of the plurality of different types of data may respectively correspond to unique rules that describe the expected format for the respective type of data.

After confirming that the data component of the initial state of the FSM contains only properly formatted values, the validation server may then confirm that the data contains values within an expected range of values. For example, an insurance policy may contain a data field representative of the name of the agent managing the policy. This data field may contain the value "Jon Smith" which is in a valid format for an agent's name. The validation server may then query a database of all agents in a contractual relationship with the insurance provider to determine that "Jon Smith" is the name of an actual agent. In this example, if "Jon Smith" is not found within the agent database, then "Jon Smith" is not within the expected range of values, and thus, invalid.

In some scenarios, two different data fields may be compared to each other to determine if they are within an expected range of values. As an example, an insurance policy may correspond to both a start date and an expiration date. If the expiration date indicates a date prior to the start date, one (or both) of the data fields are outside of the expected range of values, and thus, invalid. Other examples may include ensuring that an indication of a particular vehicle or property associated with a policyholder is covered by the corresponding policy, and/or determining that a true/false value is correctly set.

Once the validation server completes the pre-test analysis of the data component of the initial state of the FSM, the validation server may then determine if invalid data was discovered (block 430). When the validation server discovers any data that is invalidly formatted and/or outside of an expected range of values ("NO"), the validation server may generate an error report detailing the nature of the invalid data (block 460). When the validation server determines that all of that data is valid ("YES"), the validation server may proceed to processing the batch data (block 440).

While processing the batch data, the validation server may cause the FSM to execute instructions from the set of batch jobs contained within the $n^{th}$ set of batch data. These instructions may be designed to validate the property under test. For example, the property under test may be that when creating a new fire insurance policy, the policy generator should create a new policy number that begins with an "F" and generate a confirmation that the account was created. In this example, a set of batch jobs may include a request to create a new fire insurance policy for a new customer (including any required data). While testing the same property, the batch database may also contain another set of batch jobs that includes creating a new homeowner's insurance policy for a new customer and/or subsequently adding a fire or home insurance policy to that customer's account.

Further, the validation server may determine which module contained in the code component of the initial state of the FSM should execute the instructions contained within the set of batch jobs. For example, the validation server may route an instruction to process an insurance claim to a claim processing module. In some scenarios, the instruction itself may include an indication of which component should execute the instruction. It should be appreciated that for some sets of batch jobs, the validation server may route different instructions from the set of batch jobs to a plurality of different modules contained within the code component of the initial state of the FSM.

Once the FSM finishes executing the instructions, at least one of the data and time components of the initial state of the FSM may have been altered. As a result, the FSM is in a new, $n^{th}$ state after executing the instructions. Subsequently, the validation server may then analyze the $n^{th}$ state of the FSM (block 445). This post-processing validation may also comprise two steps: (i) confirming that data stored in the data component of $n^{th}$ state of the FSM are valid; and/or (ii) confirming that the FSM adheres to the property under test. The first step of the post-processing validation may proceed in the same or similar manner that the validation server pre-tested the initial state of the FSM (block 425): (i) confirm that the data is in a proper format; and/or (ii) confirm that the values of the data are within a range of allowable and/or expected values.

To determine whether the $n^{th}$ state of the FSM adheres to the property under test, the validation server may first determine which data fields need to be validated. Every property may implicate a different subset of the plurality of data fields in the data component of the $n^{th}$ state of the FSM. Accordingly, in order to validate that the property holds true, each property may require determining a specific allowable range of values for each of the implicated subset of the plurality of data fields. Returning to the exemplary property stating that when a fire insurance policy is generated, the new policy number should begin with an "F" and a confirmation is generated, the allowable range for the newly created policy number data field may be all possible policy numbers beginning with the letter "F" (assuming there are no other restrictions on policy numbers) and the allowable range for a Boolean variable indicating whether a confirmation was generated may be "true."

As another example, a specific automobile insurance policy may contain an upper limit of covering up to four drivers. A property of this policy may be that when the policyholder attempts to add a fifth driver via a web server, the web server prevents the addition of the fifth driver. In this example, the allowable range for a data field representative of the number of drivers covered by the automotive insurance account may be 1-4, inclusive. Of course, other properties may require that any number data fields must contain values that fall within any determinable range of values.

Once the validation server determines the allowable range of values for the property under test, the validation server may then confirm that the corresponding data fields of the data component of the $n^{th}$ state of the FSM actually fall within the allowable range. Again returning to the new fire insurance policy example, a data field representative of the new policy number containing the value of "A123456" is outside of the allowable range, while a data field representative of the new policy number containing the value "F456789" is within the allowable range. In further scenarios in which the batch jobs of the $n^{th}$ set of batch data contained instructions to create a plurality of new fire insurance policies, the validation server may confirm that the data fields representative of the policy number for each of the plurality of new fire insurance policies is within the determined allowable range.

According to present embodiments, the validation server may then determine that the property held true after processing the batch data (block 450). When the validation server determined that implicated data fields of the data component of the $n^{th}$ state of the FSM are within the allowable range for the property under test ("YES"), the validation server may proceed to start another iteration by loading the next set of batch data from the batch database (block 420). It should be appreciated that the current or $n^{th}$ state of the FSM will become the initial or n−1 state of the FSM for the next iteration. If the current iteration was the $m^{th}$ iteration (i.e., n=m), the validation server may generate an indication that the property under test was successfully validated instead of attempting to load the next set of batch data.

When the validation server determined that implicated data fields of the data component of the $n^{th}$ state of the FSM are outside of the allowable range for the property under test and/or that data fields in the data component of the $n^{th}$ state of the FSM are invalidly formatted ("NO"), the validation server may generate an error report (block 460). The error report may be a verbal indication of why the property-based testing failed. In some embodiments, the error report may include a description of the property under test, which data field is invalidly formatted and/or outside the allowable range of values, a description of the allowable range of values, which iteration of the test failed, an indication of which modules modified the failing data field, and/or other descriptions of the testing that occurred. Although, method 400 depicts generating an error report as the end of the process, in some embodiments, after the error report is generated, the validation server may continue executing each of the m iterations of the property-based testing where it left off. If any subsequent invalid data is detected, an error report describing the newly failed test scenario may be generated as part of an error log describing all failures that occurred during the property-based testing. The exemplary method 400 may include additional, fewer, or alternate actions, including those discussed elsewhere herein.

V. Exemplary Property-Based Testing

Figure 5:
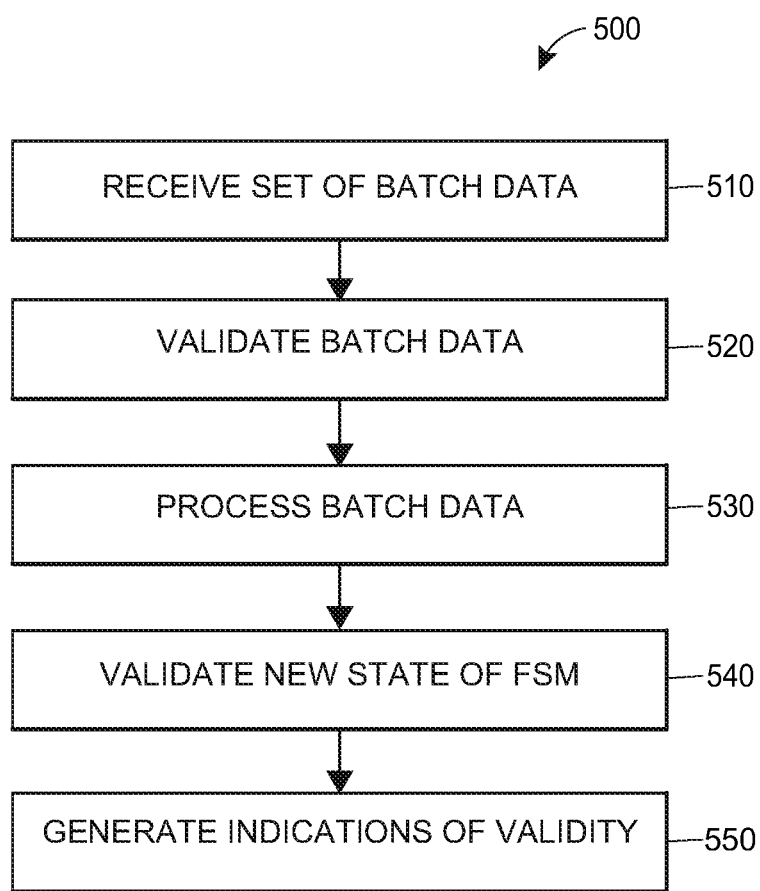
FIG. 5 depicts an exemplary flow diagram associated with a single cycle executed at a validation server, such as the validation server of FIG. 1, for determining whether a property is properly implemented, in accordance with some embodiments.

Referring to FIG. 5, depicted is an exemplary flow diagram of a method 500 for determining whether a set of properties are properly implemented. The method 500 may be facilitated by a validation server (such as the validation server 150 as depicted in FIG. 1) in communication with a FSM (such as the FSM 130 as depicted in FIG. 1) and a batch database (such as the batch database 140 as depicted in FIG. 1). In some scenarios, the method 500 may be substantially similar to a single iteration or cycle of the property-based validation testing described by the method 400. Prior to beginning the method 500, the FSM may be in an initial or first state.

The validation server may begin by receiving from the batch database a set of batch data designed to determine whether a first set of properties are properly implemented (block 510). The batch data may include sets of instructions and corresponding inputs that cause the FSM to perform actions required to test each of the set of properties. The instructions and inputs may vary depending upon the set of properties being validated. According to some embodiments, the instructions may include a request to add a new insurance product, a request to modify an existing insurance product, a request to terminate an existing insurance product, and/or a request to process a claim corresponding to an insurance product.

According to present embodiments, the validation server may then validate that the data contained in the set of batch data is in a valid format (block 520). As part of the validation, the validation server may confirm that data fields contained within the first set of batch data are in a proper format for that particular type of data field. According to some embodiments, the data fields include an insurance policy number, a claim identification number, a person associated with an insurance policy, a property owned by a policyholder, a vehicle owned by a policyholder, and/or a date corresponding to the transaction request. As an example, the validation server may confirm a claim identification number comprises the proper number of characters for a claim identification number. The validation server may then confirm that properly formatted data fields contained within the first set of batch data contain values within an expected range of values. As another example, this may include determining that the date for a transaction request is not a date later than the date contained in the time component of the FSM.

After validating the batch data, the validation server may then process the instructions contained in the batch data (block 530). As described elsewhere herein, the validation server may determine an appropriate module contained in the FSM that should execute each instruction contained within the batch data and/or then cause each instruction to be executed by the corresponding appropriate module. After the modules execute the instructions, the FSM may enter a second and/or new state.

Once the FSM enters the second the state, the validation server may then validate whether the second and/or new state adheres to the first set of properties (block 540). More particularly, the validation server may validate that data fields within the data component of the second state of the FSM adhere to the first set of properties. As described elsewhere herein, this validation may include determining an allowable range of values required by the first set of properties and confirming that the corresponding data fields of the second state are within the allowable range of values. According to some embodiments, the allowable range may include a set of identifiers corresponding to people associated with an insurance product, a set of identifiers corresponding to vehicles associated with an insurance product, a set of identifiers corresponding to properties associated with an insurance product, a range of allowable policy numbers, and/or true or false.

The validation server may then generate an indication describing the results of the validation of both the first set of batch data and the second state of the FSM (block 550). For example, if the first set of batch data was invalid or the second state of the FSM was invalid, the validation server may generate an indication identifying the invalid data fields and/or the particular property of the first set of properties that formed the basis of invalidity. Conversely, if both the first set of batch data and the second state of the FSM are valid, the validation server may generate an indication that the first set of properties were successfully validated. After generating the validity indications, the validation server may then receive a second set of batch data designed to validate a second set of properties and return to the beginning of the method 500. The exemplary method 400 may include additional, fewer, or alternate actions, including those discussed elsewhere herein.

VI. Exemplary Validation Server

Figure 6:
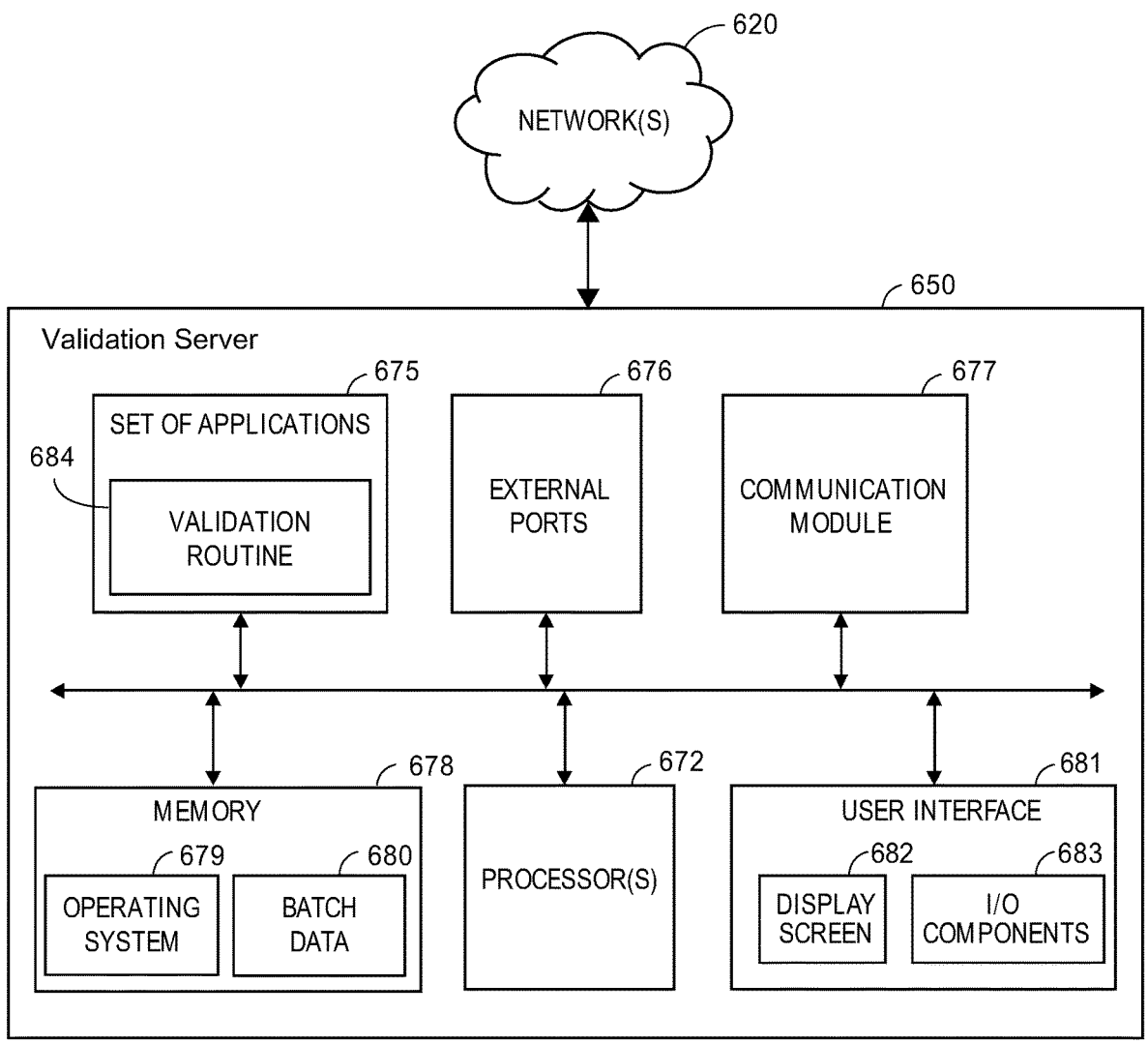
FIG. 6 is a block diagram of an exemplary validation server, such as the validation server of FIG. 1, in accordance with some embodiments.

FIG. 6 illustrates a diagram of an exemplary validation server 650 (such as the validation server 150 as discussed with respect to FIG. 1) in which the functionalities as discussed herein may be implemented. It should be appreciated that the hardware server 650 may be associated with an insurance provider, as discussed herein.

The hardware server 650 may include processor(s) 672, as well as a memory 678. The memory 678 may store an operating system 679 capable of facilitating the functionalities as described herein. The validation server 650 may also store a set of applications 675 (i.e., machine readable instructions). For example, one of the set of applications 675 may be a validation routine 684 configured to validate whether a test computer environment adheres to a property or set of properties. It should be appreciated that other applications are envisioned.

The processor(s) 672 may interface with the memory 678 to execute the operating system 679 and the set of applications 675. According to some embodiments, the memory 678 may also include batch data 680 that may include batch jobs and batch inputs designed to test properties under test. The validation routine 684 may access the batch data 680 to perform the validation. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

In some embodiments, the processor(s) 672 may dynamically allocate resources located in the memory 678 to optimize the performance of the validation server 650. For example, the processors(s) 672 may determine that an overall complexity for each property under test based upon the number of different data fields that need to be validated and/or the amount of data stored in each data field. For more complex properties, the processor(s) 672 may dynamically allocate more resources of the memory 678 than for less complex properties.

The validation server 650 may further include a communication module 677 configured to communicate data via one or more networks 620. According to some embodiments, the communication module 677 may include one or more transceivers (e.g., WWAN, WLAN, and/or WPAN transceivers) functioning in accordance with IEEE standards, 3GPP standards, or other standards, and/or configured to receive and transmit data via one or more external ports 676. For example, the communication module 677 may send, via the network 620, an indication that the validation was successful. The validation server 650 may further include a user interface 681 configured to present information to a user and/or receive inputs from the user.

As shown in FIG. 6, the user interface 681 may include a display screen 682 and I/O components 683 (e.g., ports, capacitive or resistive touch sensitive input panels, keys, buttons, lights, LEDs, speakers, microphones). According to the present embodiments, the user may access the validation server 650 via the user interface 681 to load batch data, set up a test environment, and/or perform other functions. In some embodiments, the validation server 650 may perform the functionalities as discussed herein as part of a "cloud" network or can otherwise communicate with other hardware or software components within the cloud to send, retrieve, or otherwise analyze data.

The validation server 650 may be a local or remote server. For instance, the validation server 650 may be a remote server, such as a remote located server associated with the insurance provider. Additionally or alternatively, the validation server 650 may be located with a developer of a particular hardware or software module. The validation server 650 may include additional, fewer, or alternate components, modules, or steps, including those discussed elsewhere herein VII. Additional Considerations Some embodiments discussed herein may be related to testing of daily batch systems and/or mainframe batch testing. For instance, various types of insurance policies, insurance policy data, and/or modules associated with insurance policies may be updated on a daily basis. The types of insurance policies may include auto, home, fire, life, health, renters, pet, burial, personal articles, and/or other types of insurance.

The embodiments discussed herein may be used to verify new insurance policies are correct and/or verify vehicle, home, apartment, personal articles, person, and/or customer information is correct or current. The present embodiments may also verify that vehicles, homes, personal articles, people, family members, and/or other things to be insured and/or that are presently insured actually exist.

The present embodiments may confirm various numbers and/or information, such as policy numbers, vehicle information, house information, etc. The present embodiments may also be used to verify various insurance-related transactions and/or insurance policy updates or changes are correct, such as confirming accuracy of various testing inputs, such as vehicles, drivers, owners, homes, personal articles, addresses, customer information, insurance coverages, deductibles, and limits, and/or other inputs.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A method implemented in a test computer environment, wherein the test computer environment contains a finite-state machine (FSM) that replicates a production computer environment in a first state, the method comprising:

receiving, via a computer network, a first set of batch data, wherein the first set of batch data is designed to determine whether a first set of properties corresponding to the FSM are properly implemented;

validating, via one or more particularly programmed processors, that data contained in the first set of batch data is in a valid format by confirming any data field contained within the first set of batch data is in a proper format for the corresponding data field, wherein the data fields include at least one of an insurance policy number, a claim identification number, a person associated with an insurance policy, a property owned by a policyholder, a vehicle owned by a policyholder, or a date corresponding to a transaction request;

processing, via the one or more processors, the first set of batch data, wherein the processing of the first set of batch data causes the FSM to enter a second state;

validating, via the one or more processors, that corresponding data fields of the second state of the FSM adheres to the first set of properties under test; and based upon the validations, generating, via the one or more processors, an indication of whether the first set of batch data and the second state of the FSM are valid.

2. The method of claim 1, further comprising:
receiving, via the computer network, a second set of batch data, wherein the second set of batch data is designed to determine whether a second set of properties corresponding to the FSM are properly implemented.

3. The method of claim 2, wherein the FSM is in the second state when receiving the second set of batch data.

4. The method of claim 1, wherein the first set of batch data includes at least one of:
a request to add a new insurance product, a request to modify an existing insurance product, a request to terminate an existing insurance product, and a request to process a claim for corresponding to an insurance product.

5. The method of claim 1, wherein validating the first set of batch data further comprises:
confirming, via the one or more processors, that properly formatted data fields contained within the first set of batch data contain values within an expected range of values.

6. The method of claim 5, wherein the data fields include at least one of:
an insurance policy number, a claim identification number, a person associated with an insurance policy, a property owned by a policyholder, a vehicle owned by a policyholder, and a date corresponding to the transaction request.

7. The method of claim 1, wherein validating that the corresponding data fields of the second state adhere to the first set of properties under test further comprises:
determining, via the one or more processors, an allowable range of values required by the first set of properties; and
confirming, via the one or more processors, that the corresponding data fields of the second state are within the allowable range of values.

8. The method of claim 7, wherein the allowable range of values includes at least one of:
a set of identifiers corresponding to people associated with an insurance product, a set of identifiers corresponding to vehicles associated with an insurance product, a set of identifiers corresponding to properties associated with an insurance product, a range of allowable policy numbers, or true or false.

9. The method of claim 1, wherein generating the indications of whether the first set of batch data and the second state of the FSM are valid further comprises:
when the first set of batch data or the second state is invalid, generating, via the one or more processors, an indication identifying the invalid data field and the corresponding property under test that formed the basis of invalidity; and when the first set of batch data and the second state are valid, generating, via the one or more processors, an indication of a successful validation of the first set of properties.

10. A system comprising:
a communication module adapted to communicate data;
a finite-state machine (FSM), wherein an initial state of the FSM replicates a state of a production computer component;
a memory adapted to store non-transitory computer executable instructions; and
one or more particularly programmed processors adapted to interface with the communication module, wherein the one or more processors are configured to execute the non-transitory computer executable instructions to cause the system to:
receive, via the communication module, a first set of batch data, wherein the first set of batch data is designed to determine whether a first set of properties corresponding to the FSM are properly implemented;
validate that data contained in the first set of batch data is in a valid format by confirming any data field contained within the first set of batch data is in a proper format for the corresponding data field, wherein the data fields include at least one of an insurance policy number, a claim identification number, a person associated with an insurance policy, a property owned by a policyholder, a vehicle owned by a policyholder, or a date corresponding to a transaction request;
process the first set of batch data, wherein the processing of the first set of batch data causes the FSM to enter a second state;
validate that corresponding data fields of the second state of the FSM adheres to the first set of properties under test; and
based upon the validations, generate an indication of whether the first set of batch data and the second state of the FSM are valid.

11. The system of claim 10, wherein the instructions, when executed, cause the system to:
receive, via the communication module, a second set of batch data, wherein the second set of batch data is designed to determine whether a second set of properties corresponding to the FSM are properly implemented.

12. The system of claim 11, wherein the FSM is in the second state when receiving the second set of batch data.

13. The system of claim 10, wherein the first set of batch data includes at least one of:
a request to add a new insurance product, a request to modify an existing insurance product, a request to terminate an existing insurance product, and a request to process a claim for corresponding to an insurance product.

14. The system of claim 10, wherein to validate the first set of batch data, the instructions, when executed, cause the system to:
confirm that properly formatted data fields contained within the first set of batch data contain values within an expected range of values.

15. The system of claim 14, wherein the data fields include at least one of:
an insurance policy number, a claim identification number, a person associated with an insurance policy, a property owned by a policyholder, a vehicle owned by a policyholder, and a date corresponding to the transaction request.

16. The system of claim 10, wherein to validate that the corresponding data fields of the second state adhere to the first set of properties under test, the instructions, when executed, cause the system to:
   determine an allowable range of values required by the first set of properties; and
   confirm that the corresponding data fields of the second state are within the allowable range of values.

17. The system of claim 16, wherein the allowable range of values includes at least one of:
   a set of identifiers corresponding to people associated with an insurance product, a set of identifiers corresponding to vehicles associated with an insurance product, a set of identifiers corresponding to properties associated with an insurance product, a range of allowable policy numbers, or true or false.

18. The system of claim 10, wherein to generate the indications of whether the first set of batch data and the second state of the FSM are valid, the instructions, when executed, cause the system to:
   when the first set of batch data or the second state is invalid, generate, an indication identifying the invalid data field and the corresponding property under test that formed the basis of invalidity; and
   when the first set of batch data and the second state are valid, generate an indication of a successful validation of the first set of properties.

19. A non-transitory computer-readable storage medium storing processor-executable instructions, that when executed cause one or more particularly programmed processors to:
   receive, via a computer network, a first set of batch data, wherein the first set of batch data is designed to determine whether a first set of properties corresponding to a finite-state machine are properly implemented;
   validate, by the one or more processors, that data contained in the first set of batch data is in a valid format by confirming any data field contained within the first set of batch data is in a proper format for the corresponding data field, wherein the data fields include at least one of an insurance policy number, a claim identification number, a person associated with an insurance policy, a property owned by a policyholder, a vehicle owned by a policyholder, or a date corresponding to a transaction request;
   process, by the one or more processors, the first set of batch data, wherein the processing of the first set of batch data causes the finite-state machine to enter a new state;
   validate, by the one or more processors, that corresponding data fields of the new state of the finite-state machine adheres to the first set of properties under test; and
   based upon the validations, generate, by the one or more processors, an indication of whether the first set of batch data and the new state of the finite-state machine are valid.

* * * * *